US008051005B2

(12) United States Patent
Jacobsen

(10) Patent No.: US 8,051,005 B2
(45) Date of Patent: *Nov. 1, 2011

(54) AUTOMATED METHOD AND ARTICLE OF MANUFACTURE FOR FULLY INSURING LARGE BANK DEPOSITS VIA A NETWORK OF BANKS WITH LIMITS ON AMOUNT OF ORDERS THAT A BANK AND/OR CUSTOMER CAN PLACE WITH THE NETWORK

(75) Inventor: Mark P. Jacobsen, Arlington, VA (US)

(73) Assignee: Promontory Interfinancial Network, LLC, Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/842,748

(22) Filed: Jul. 23, 2010

(65) Prior Publication Data

US 2011/0166991 A1    Jul. 7, 2011

Related U.S. Application Data

(63) Continuation of application No. 12/120,944, filed on May 15, 2008, which is a continuation of application No. 10/347,128, filed on Jan. 17, 2003, now Pat. No. 7,376,606, which is a continuation-in-part of application No. 10/124,462, filed on Apr. 17, 2002, now Pat. No. 7,440,914.

(60) Provisional application No. 60/307,815, filed on Jul. 27, 2001, provisional application No. 60/323,365, filed on Sep. 20, 2001.

(51) Int. Cl.
*G06Q 40/00* (2006.01)

(52) U.S. Cl. .............................. 705/39; 705/35; 705/42

(58) Field of Classification Search ................... 705/35, 705/42, 39
See application file for complete search history.

(56) References Cited

U.S. PATENT DOCUMENTS 4,774,663 A    9/1988    Musmanno et al.
(Continued)

FOREIGN PATENT DOCUMENTS

WO    0169503 A1    9/2001

OTHER PUBLICATIONS

Patrick Parrish, "Home Financial Calculator," May 1985, Compute!, Issue 60, p. 29, 4 pages.

(Continued)

*Primary Examiner* — Jagdish Patel
*Assistant Examiner* — Kevin Poe
(74) *Attorney, Agent, or Firm* — Panitch Schwarze Belisario & Nadel LLP

(57)    ABSTRACT

An automated method is provided for processing large deposits that exceed an established deposit insurance limit so that the large deposits are fully insured. The large deposits are received from a plurality of unaffiliated banks from their respective depositors. Orders are received at a processor from the plurality of banks to process large deposits. The processor automatically compares each order to a preset maximum order amount. Each of the large deposits for each order are partitioned using the processor into a plurality of deposit portions if the order does not exceed a preset maximum order amount. The partitioning is performed in a manner so that each deposit portion does not exceed the established deposit insurance limit. The processor assigns at least some of the deposit portions for each of the large deposits for each order to at least some banks that are unaffiliated with the bank that received the large deposit for deposit therein if the order does not exceed the preset maximum order amount.

20 Claims, 10 Drawing Sheets

U.S. PATENT DOCUMENTS

| | | | | |
|---|---|---|---|---|
| 4,985,833 | A * | 1/1991 | Oncken | 705/42 |
| 5,893,078 | A | 4/1999 | Paulson | |
| 6,098,051 | A | 8/2000 | Lupien et al. | |
| 6,131,810 | A | 10/2000 | Weiss et al. | |
| 6,374,231 | B1 * | 4/2002 | Bent et al. | 705/36 R |
| 7,249,095 | B2 | 7/2007 | Davies et al. | |
| 7,509,286 | B1 * | 3/2009 | Bent et al. | 705/39 |
| 7,519,551 | B2 * | 4/2009 | Bent et al. | 705/35 |
| 7,536,350 | B1 * | 5/2009 | Bent et al. | 705/39 |
| 2002/0010670 | A1 | 1/2002 | Mosler et al. | |
| 2002/0091637 | A1 | 7/2002 | Bent et al. | |
| 2002/0118221 | A1 | 8/2002 | Hudson et al. | |
| 2002/0194107 | A1 | 12/2002 | Li et al. | |
| 2003/0018554 | A1 | 1/2003 | Lyftogt et al. | |
| 2004/0177036 | A1 | 9/2004 | Nutahara et al. | |
| 2005/0108149 | A1 * | 5/2005 | Bent et al. | 705/38 |
| 2005/0228733 | A1 * | 10/2005 | Bent et al. | 705/35 |
| 2006/0212385 | A2 * | 9/2006 | Bent et al. | 705/38 |
| 2006/0212389 | A2 * | 9/2006 | Bent et al. | 705/40 |
| 2007/0043666 | A1 | 2/2007 | Burdette | |
| 2007/0244786 | A1 | 10/2007 | Orr | |
| 2007/0271174 | A2 * | 11/2007 | Bent et al. | 705/38 |
| 2008/0120228 | A1 * | 5/2008 | Bent et al. | 705/39 |

OTHER PUBLICATIONS

File History of U.S. Trademark (service mark) Application for "Reserve Insured Deposits," U.S. Appl. No. 76/315,660, stating First Use in Commerce in Oct. 9, 1997, 22 pages.

Brochure entitled: "Reserve Insured Deposits®," Copyright © 2006, Reserve Management Corporation, 2 pages.

Brochure entitled: "What Sets Us Apart," Copyright © 2006, Reserve Management Corporation, 2 pages.

Charles Keenan, "Tapping Brokerages for Alternative to CDs," American Banker, Feb. 18, 2004, 3 pages.

Brochure entitled: "CMA® Insured Savings™ Account Fact Sheet," Copyright © 1994, 1995, Merrill Lynch & Co., Inc., 13 pages.

PCT International Search Report for PCT/US02/23518, mailed May 27, 2003, 5 pages.

License offer letter to Cardinal Bancshares, Inc. for First City, Texas Insured Savings Program with "Insured Savings Product Description" enclosure, letter dated Sep. 20, 1994, 6 pages total.

First City, Texas Insured Savings Product Announcement and Product Bulletin, product announcement dated May 8, 1989, 7 pages total.

Allied Banks product announcement "Allied Banks Introduce New Bonus Rate Allinsured Deposits," Allied Bank of Texas, undated document, 2 pages.

Printouts from Reserve Management Corporation website, including company history and Reserve Insured Deposits$^{SM}$ account, printout dates: Mar. 24 and 25, 2003, 20 pages total.

First City Insured Savings Program (ISP) Ref. A: First City, Texas Insured Savings, Copyright © 1989, 5 pages total.

First City Insured Savings Program (ISP) Ref. B: First City, Texas Insured Savings, Agency Agreement, Jun. 1990, and related brochure, 11 pages total.

First City Insured Savings Program (ISP) Ref. C: Victoria Bankshares Business Proposal letter dated Nov. 21, 1989 (10 pages including enclosures) and Victoria Bankshares Business Proposal letter dated Dec. 27, 1989 (6 pages) with the following enclosures: "Insured Savings Correspondent Agreement" (7 pages); "Insured Savings Agency Agreement" (6 pages); "Insured Savings Program Description" (2 pages); "Correspondent Bank Insured Savings Product Delivery Procedures" (6 pages); "Insured Savings Investment Instruction Form" (1 page); Sharing+.

First City Insured Savings Program (ISP) Ref. D: 5 letters each dated Jul. 3, 1990 regarding interest rates and maximum deposit limits for correspondent banks, including: letter to First City, Texas-Dallas (1 page); letter to First National Bank President Bill Goertz (1 page); letter to First National Bank Marketing Officer Susan Goodwin (3 pages); letter to First City, Texas-Sour Lake (1 page); letter to Bank of the West (2 pages). All letters dated Jul. 3, 1990. 9 pages total.

Brochure entitled "Reserve Insured Deposits® Program," Copyright © 2006, Reserve Management Corporation, 2 pages.

\* cited by examiner

AUTOMATED METHOD AND ARTICLE OF MANUFACTURE FOR FULLY INSURING LARGE BANK DEPOSITS VIA A NETWORK OF BANKS WITH LIMITS ON AMOUNT OF ORDERS THAT A BANK AND/OR CUSTOMER CAN PLACE WITH THE NETWORK

CROSS-REFERENCE TO RELATED APPLICATIONS

This application is a continuation of U.S. patent application Ser. No. 12/120,944 filed May 15, 2008, which, in turn, is a continuation of U.S. patent application Ser. No. 10/347,128 filed Jan. 17, 2003, now U.S. Pat. No. 7,376,606, which, in turn, is a continuation-in-part of U.S. patent application Ser. No. 10/124,462 filed Apr. 17, 2002, now U.S. Pat. No. 7,440,914. Each of the above-identified applications are incorporated herein by reference in their entirety.

This application claims the benefit of U.S. Provisional Application No. 60/307,815, filed Jul. 27, 2001 and U.S. Provisional Application No. 60/323,365, filed Sep. 20, 2001.

BACKGROUND OF THE INVENTION

In many banking systems throughout the world, bank deposits of individual depositors are insured by government-run deposit insurance programs up to an established deposit insurance limit. In the United States, for example, the current deposit insurance limit is generally $100,000 per individual account per depositor in any one bank. A similar insurance limit for credit union accounts is also in effect for deposits in U.S. credit unions.

Depositors wishing to have government-backed insured funds on large bank deposits in excess of the established insurance limit have limited options. A depositor can choose to open multiple accounts in separate banks, each account being maintained at an amount up to the established insurance limit. This process is time-consuming and administratively cumbersome. Alternatively, a depositor can place a large deposit in an amount that is a multiple of the established insurance limit through a banking company having a number of affiliated banks to which portions of the large amount may be transmitted for deposit. In the United States, such multi-account deposit services are currently offered by only a few financial institutions, such as Citigroup Inc., Merrill Lynch & Co., Inc. and Fishback Financial Corporation. Thus, competition is limited and, for the vast majority of depositors, there is no opportunity to obtain such a service from a local community bank. Additionally, a depositor (or the bank at which the deposit is to be placed) can purchase deposit insurance from a private insurance company. But such insurance can be expensive and raises concern as to whether the private insurance company is able to satisfy its obligations in the event of a banking system failure. In addition, deposit brokers may be used to distribute a depositor's funds among multiple banks, each of which could offer protection up to the established deposit insurance limit. This alternative usually requires banks to pay the highest rates available throughout the country, and usually requires depositors to establish relationships with unknown institutions.

The growth of bank core deposits has failed to keep pace with loan and asset growth, particularly in community banks. As a result, banks have turned to alternative funding sources, such as Federal Home Loan Bank (FHLB) advances, wholesale funding and brokered deposits. These alternative funding sources are both more expensive and volatile than traditional core deposits, causing the net interest margins of the banks to be reduced and subjecting the banks to increased risk.

While the relative amount of insured bank deposits has declined over the past four decades (in comparison to loan growth), the demand for large denomination risk-free investment products has remained strong. What is needed is a method and apparatus for processing large deposits to help banks attract new depositors looking to invest large amounts of funds in an investment vehicle eligible for full deposit insurance coverage.

BRIEF SUMMARY OF THE INVENTION

The present invention establishes an Interbank Deposit Service that allows a bank to offer multiple bank deposits to its customers in order to achieve deposit insurance in aggregate amounts greater than the amount any individual bank could offer (i.e., the established deposit insurance limit). The banks whose deposits are offered through the Interbank Deposit Service are normally unaffiliated with one another. Each of the deposits may be a certificate of deposit (CD).

The banks are federally insured financial institutions that are approved to participate in an Interbank Deposit Placement System (IDPS) that provides the Interbank Deposit Services.

In a preferred embodiment of the present invention, a potential deposit amount that exceeds an established deposit insurance limit is processed using a computer-implemented method so that the total amount to be deposited is fully insured. The order to process the potential deposit amount is submitted to the Processor, which establishes multiple deposits, each with a different bank, for the customer seeking to deposit the potential deposit amount. Each deposit has a predetermined maturity. The Processor receives multiple orders submitted by banks to process the potential deposit amounts. The Processor allocates the potential deposit amounts to deposits at multiple banks so that no deposit exceeds the established deposit insurance limit. Through the Processor, a deposit is established for the depositor at the bank to which a portion of the depositor's funds was allocated as a deposit by the Processor.

Each bank submitting an order to process potential deposit amounts to the Processor agrees to accept from the Processor an aggregate amount of deposits equal to the potential amount submitted to the Processor.

Each bank submitting an order to process potential deposit amounts to the Processor may specify a deposit interest rate. The Processor may compare the specified deposit interest rate to an interest rate determined by the Processor based on the specified rates submitted by all banks to the Processor (i.e., ERate) participating in an allocation.

The ERate determined by the Processor for a given allocation of potential deposit amounts may be based on a volume weighted average rate specified for potential deposit amounts with the same maturity.

The Processor may calculate the amount of a payment to be made to or received by banks participating in the allocation to compensate for differences between the deposit interest rate specified by a bank and the ERate determined by the Processor.

The amount of each deposit may be within the established deposit insurance limit. The Processor may initiate the process of forwarding the payment to the depositor or the depositor's banks or crediting the payment to an account thereof each time that interest earned on the associated deposit is paid at the option of the depositor or to ensure that the amount of the deposit does not exceed the established insurance limit.

The Processor may prioritize the orders based on the type of deposit established at the banks, the size of each of the potential deposit amounts, the interest rates specified by the banks, the geographical location of the banks, the preferences indicated by the depositors, the preferences indicated by the banks, the ability of the banks to establish a fully insured deposit for a Lending Bank, or the availability of funds from a Lending Bank (which in turn may depend on the asset size or the credit rating of the bank at which the Lending Bank is to make a deposit).

The established deposit insurance limit may be in accordance with U.S. law, regulations and rules established by the U.S. Federal Deposit Insurance Corporation (FDIC), the National Credit Union Administration (NCUA) or other insurance programs or the laws, regulations and rules established by other jurisdictions.

In another embodiment of the present invention, a Settlement Account is established for each of the banks. The Processor receives multiple orders to process potential deposit amounts. Each order includes the maturity and interest rates of the deposits to be established for a specific potential deposit amount. The Processor sorts by maturity the deposits to be established based on the orders. The Processor may compare the interest rate specified by each bank for a potential deposit amount of a particular maturity to an ERate established by the Processor for that maturity. The Processor allocates each potential deposit amount to deposits at multiple banks. No deposit exceeds the established deposit insurance limit. The Processor allocates each deposit to a specific one of the banks. Through the Processor, a deposit is established for the depositor at the bank to which a portion of the depositor's potential deposit amount was allocated by the Processor. Based on the interest rate offered by each bank and the ERate that the Processor calculates, the Processor credits or debits a Rate Bridge Payment to the Settlement Account of each bank.

In response to each order, a proposed list of banks at which deposits, resulting from the allocation of the potential deposit amounts are to be placed, is made available to the depositor. The depositor may be offered the option of modifying the proposed list during an established time window. After the time window expires, the Processor may establish a deposit at each bank on the list. Through the Processor, a deposit is established for the depositor by the bank to which a portion of the potential deposit amount was allocated as a deposit by the Processor. The depositor associated with the deposit is the ultimate owner of the deposit. The deposit may be titled in the name of the Processor (as subcustodian for the bank that placed the order) and/or in the name of the bank that placed the order (as custodian for the depositor).

BRIEF DESCRIPTION OF THE SEVERAL VIEWS OF THE DRAWING

The following detailed description of preferred embodiments of the invention will be better understood when read in conjunction with the appended drawings. For the purpose of illustrating the invention, there are shown in the drawings embodiments that are presently preferred. It should be understood, however, that the invention is not limited to the precise arrangements and instrumentalities shown.

In the drawings.

DETAILED DESCRIPTION OF THE INVENTION

1. Definitions

Figure 1:
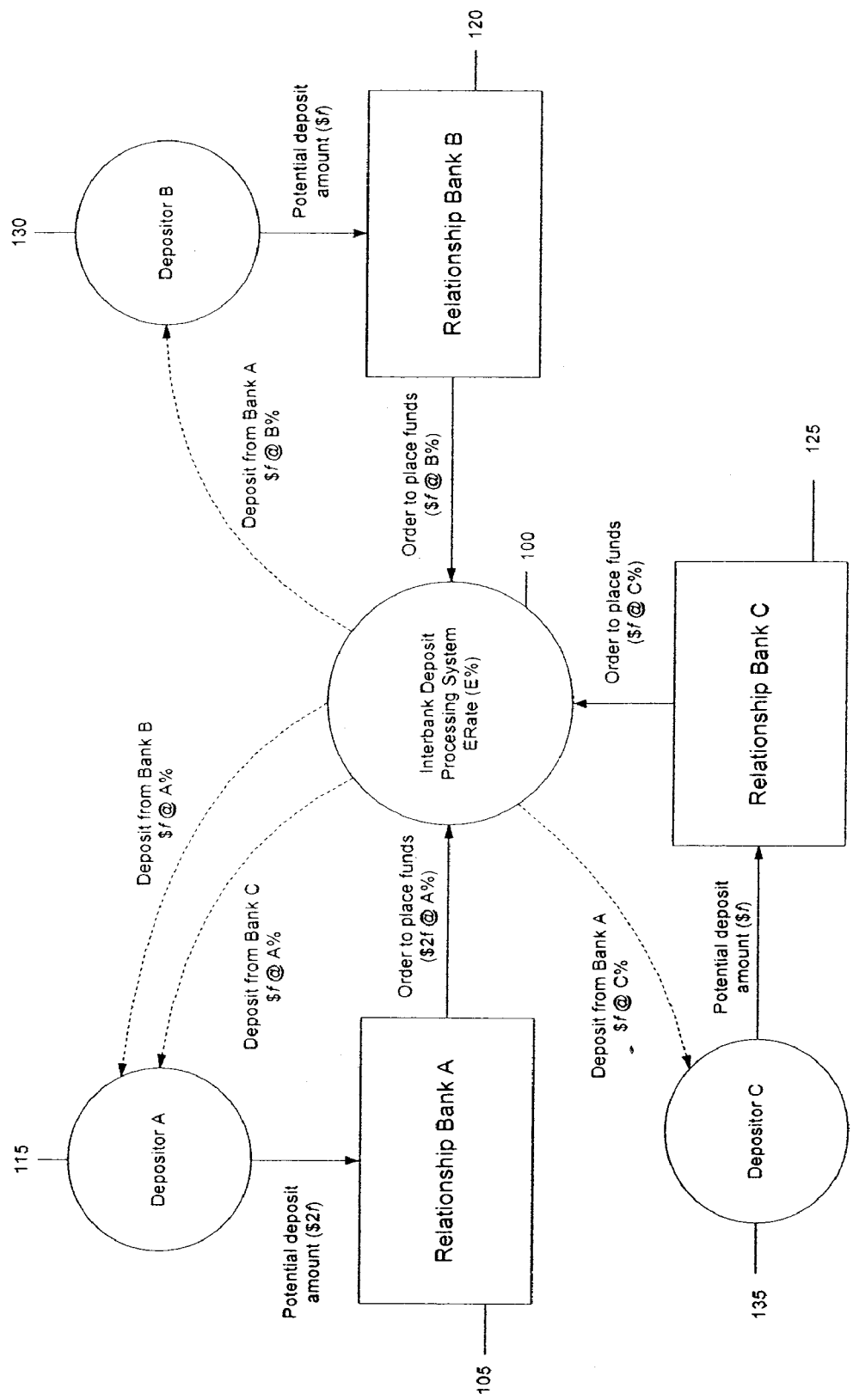
FIG. 1 is a simplified block diagram of an Interbank Deposit Placement System that processes potential deposit amounts for multiple banks in accordance with a preferred embodiment of the present invention.

"Bank" generally refers broadly to a financial institution that offers deposits that are insured up to an established deposit insurance limit. The term "bank" can include, but is not limited to, banks, thrifts, credit unions, savings & loans, industrial loan companies and other depository institutions that can provide deposits guaranteed by government-backed deposit insurance. A bank may be a member of the Interbank Deposit Service.

"Custodian" refers to a Relationship Bank that acts as a custodian for depositors with respect to deposits established through the Interbank Deposit Service.

"Deposit" refers to an agreement between a depositor and bank pursuant to which the bank promises to pay the depositor a particular rate of return (e.g., a fixed or variable interest rate) for allowing the bank to hold and use funds received from the depositor. The term "deposit" includes, but is not limited to, time deposits (CDs) and non-time demand deposits. Without limiting the foregoing, deposits may be in uncertificated form or certificated form.

"Deposit mismatch" refers to an imbalance when a bank (as Relationship Bank) places orders with the Interbank Deposit Placement System to process potential deposit amounts made available by depositors and the bank (as Receiving Bank) is not allocated an equivalent dollar amount of portions of deposits by the Interbank Deposit Placement System in return for the orders.

"Deposit Placement Failure" refers to an occurrence when there are not enough banks at which the Interbank Deposit Placement System can establish deposits in order to ensure full insurance coverage for all potential deposit amounts. This generally results from a bank submitting to the Interbank Deposit Service a very large potential deposit amount.

"Deposit portion" or "tranche" refers to a portion of a potential deposit amount, the amount of which does not exceed the established deposit insurance limit.

"Depositor Agreement" refers to a legal agreement between a Relationship Bank and a depositor that authorizes the Relationship Bank to place orders for potential deposit amounts with the IDPS.

"ERate" refers to an earnings (i.e., interest) rate that may be used in the determination of an interest plug amount or present value payment. The ERate could be the weighted average for a particular maturity of the interest rates of all orders received for a particular Placement Date for a particular product or it could be set to an established rate such as LIBOR.

"Established deposit insurance limit" refers to the extent to which a government or other entity insures a deposit or deposits of one customer (depositor) in one bank. As an example, the established deposit insurance limit can be in accordance with U.S. law, regulations and rules established by the U.S. Federal Deposit Insurance Corporation (FDIC) or the National Credit Union Administration (NCUA).

"f" refers to an amount of funds that does not exceed the established deposit insurance limit for a deposit. (For example, with respect to a CD, "f" is equal to a principal amount of funds that, together with any accrued interest over the term of the CD, does not exceed the established deposit insurance limit).

"Interbank Deposit Placement System" (IDPS) refers to a system that provides an Interbank Deposit Service whereby orders pertaining to potential deposit amounts that are available to banks which are members of the Interbank Deposit Service are submitted to the Processor for allocation among deposits at multiple banks in accordance with one or more algorithms.

"Interest plug" refers to a particular type of present value payment made to or received from a bank to compensate for differences among deposit terms offered by other member banks.

"Interest rate" refers to the annualized rate of return, which may be fixed and/or variable, that a bank pays a customer in exchange for the customer's funds being held at the bank. Interest rate also may be expressed as a spread above or below some agreed upon rate (e.g., T-Notes, LIBOR, or federal funds rate) or it may consist of some earnings rate.

"Issuing Agent" refers to an entity that issues deposits as agent for a Receiving Bank or Surplus Bank. An issuing agent may be the Processor.

"Lending Bank" refers to the entity (which may be one of many and which may be a bank) that agrees to place additional deposits into the Interbank Deposit Placement System to resolve deposit mismatch situations.

"LIBOR" (the London Interbank Offered Rate) refers to an international average of offered rates for dollar deposits for a term of maturity based on quotes from several major banks. It is used to calculate the rate at which banks lend funds to creditworthy banks.

"Municipal CD" refers to a certificate of deposit purchased by a state or local governmental entity.

"Order" refers to a request inputted by a representative of a Relationship Bank into the Interbank Deposit Placement System to process a potential deposit amount made available by a depositor so that portions of the potential deposit amount may be allocated to multiple banks.

"Participating Bank Agreement" refers to a legal agreement between each bank and the Sponsor that establishes the terms for participating in the Interbank Deposit Placement System.

"Placement Date" refers to the date on which the Interbank Deposit Placement System initiates the process by which potential deposit amounts are allocated to deposits at multiple banks.

"Potential deposit amounts" (also referred to herein as "funds" or "fund amounts") refers to amounts submitted for deposit, the amount of which generally exceeds an established deposit insurance limit.

"Preferred broker" refers to a broker dealer entity that facilitates or creates a secondary market for the purchase and sale of deposits established through the Interbank Deposit Service.

"Present value payment" or "PVP" (also known as a "Rate Bridge Payment") refers to a payment transferred from one bank to another to equalize, for each of the banks, the value of the interest payments over the term of the deposits established from the potential deposit amounts input into the Interbank Deposit Placement System with the interest payments over the term of the deposits that the bank (as Receiving Bank) establishes through the Interbank Deposit Placement System. Orders may be matched with other orders at the Interbank Deposit Placement System that have different deposit terms and/or principal amounts. Banks may need to make/receive a present value payment to ensure that the amount each bank places in the Interbank Deposit Placement System is equivalent to the amount each bank receives (which thereby means that the terms that the bank established with its depositor that made the potential deposit amount available are effectively reflected by the deposit that the bank receives from the Interbank Deposit Placement System). The present value payment is equal to the difference in the future cash flows (of both principal and interest payments) made by each bank, discounted back using the present value rate. The present value payments are paid/received by banks on the business day after the Placement Date.

"Present Value of Future Cash Flow" or "PV of Future Cash Flow" refers to a mathematical adjustment to account for the time value of money for a series of cash flows occurring over a period of time. This calculation is widely known to those skilled in the art.

"Processor" refers to a component of the Interbank Deposit Placement System that is responsible for allocating potential deposit amounts to multiple banks. The Processor also refers to the component of the Interbank Deposit Placement System responsible for one or all of the following: maintaining customer account records, maintaining Settlement Accounts, serving as issuing and paying agent on behalf of Receiving Institutions with respect to deposits established through the Interbank Deposit Service, and serving as subcustodian for Relationship Banks. The functions of the Processor may be performed by one or more entities.

"Receiving Bank" refers to a bank that establishes a deposit in accordance to instructions generated by the Processor.

"Relationship Bank" refers to a bank to which a potential deposit amount is made available by a depositor that places an order with the Interbank Deposit Placement System to process the potential deposit amount.

"Settlement Account" refers to an account established by a bank with the Processor or other bank through which all fees and cash flows associated with deposits established through the Interbank Deposit Service settle.

"Settlement Date" refers to the date, usually the day after a Placement Date, on which the Processor establishes deposits on behalf on banks.

"Sponsor" refers to an entity that operates a system to process potential deposit amounts, which interface may include the Processor.

"Subcustodian" refers to an entity that acts as the subcustodian for a custodian (i.e., Relationship Bank) with respect to deposits established through the Interbank Deposit Service for the depositor of the Relationship Bank. The subcustodian may be the Sponsor or other entity.

"Surplus Bank" refers to a bank that has agreed with the IDPS to accept deposit portion(s) in excess of deposit portion(s) (if any) that it is seeking to place on a given Placement Date.

2. Detailed Description

The present invention offers an Interbank Deposit Service, which permits banks that have entered into an agreement with a Sponsor of an interface used to arrange for the placement of the funds of a Depositor that exceed an established deposit insurance limit at other banks that have entered into a Participating Bank Agreement with a Sponsor. For example, a deposit insurance limit was established by the U. S. Federal Deposit Insurance Corporation (FDIC) to insure the funds of a depositor up to $100,000 at a bank.

FIG. 1 shows a simplified block diagram of an Interbank Deposit Placement System (IDPS) 100 that provides a Sponsor-operated interface used to process potential deposit amounts for banks 105, 120, 125 in accordance with the present invention. Placements of funds through the IDPS 100 are made on a best efforts basis and each bank may be required to pay a Sponsor of the IDPS 100 a fee for providing the Interbank Deposit Service. The IDPS 100 does not place a customer's funds at a particular bank if aggregating the resulting deposit with any other deposits placed by the IDPS 100 into that bank on behalf of the customer would cause the total deposits of the customer at the bank to exceed the established deposit insurance limit. Each Relationship Bank will act as custodian for its customer with respect to deposits established for the customer through IDPS 100. A Sponsor of the IDPS 100 may act as the Relationship Bank's subcustodian for the deposits. A Depositor Agreement between the bank and the customer will disclose the existence and role of the IDPS 100, the Relationship Bank's receipt of equivalent deposits through the IDPS 100, and the Relationship Bank's payment of a fee to the Sponsor of the Interbank Deposit Service.

The Interbank Deposit Service may periodically establish the maturities of multiple deposits instruments that may be offered through the IDPS 100. Each Relationship Bank 105, 120, 125 seeking placement of customer funds through the IDPS 100 will establish a rate acceptable to its customer ("Depositor" 115, 130, 135) for deposits in one or more available maturities. Deposits may compound interest daily (or at such other frequency as may be established) and deposits with shorter maturities may pay interest at maturity. For deposits with longer maturities, the Depositor may select an end of month payment or payment at maturity and may be able to select additional payment options at a later date. The Depositor's funds will be submitted to the IDPS 100 for placement at Receiving Banks on the terms agreed to by the Depositor 115, 130, 135 and the Depositor's Relationship Banks 105, 120, 125. When an order to process a potential deposit amount is placed by Relationship Bank 105, the IDPS 100 allocates the deposit portions to Receiving Banks 120 and 125. Receiving Banks 120 and 125 will establish through the IDPS 100 a deposit for Depositor 115 (a Depositor of Relationship Bank 105). When an order to process a potential deposit amount is placed by Relationship Bank 120, the IDPS 100 allocates the deposit to Receiving Bank 105. Receiving Bank 105 will establish a deposit for Depositor 130 (a Depositor of Relationship Bank 120). When an order to process a potential deposit amount is placed by Relationship Bank 125, the IDPS 100 allocates the deposit to Receiving Bank 105. Receiving Bank 105 will establish a deposit for Depositor 135 (a Depositor of Relationship Bank 125).

Figure 2:
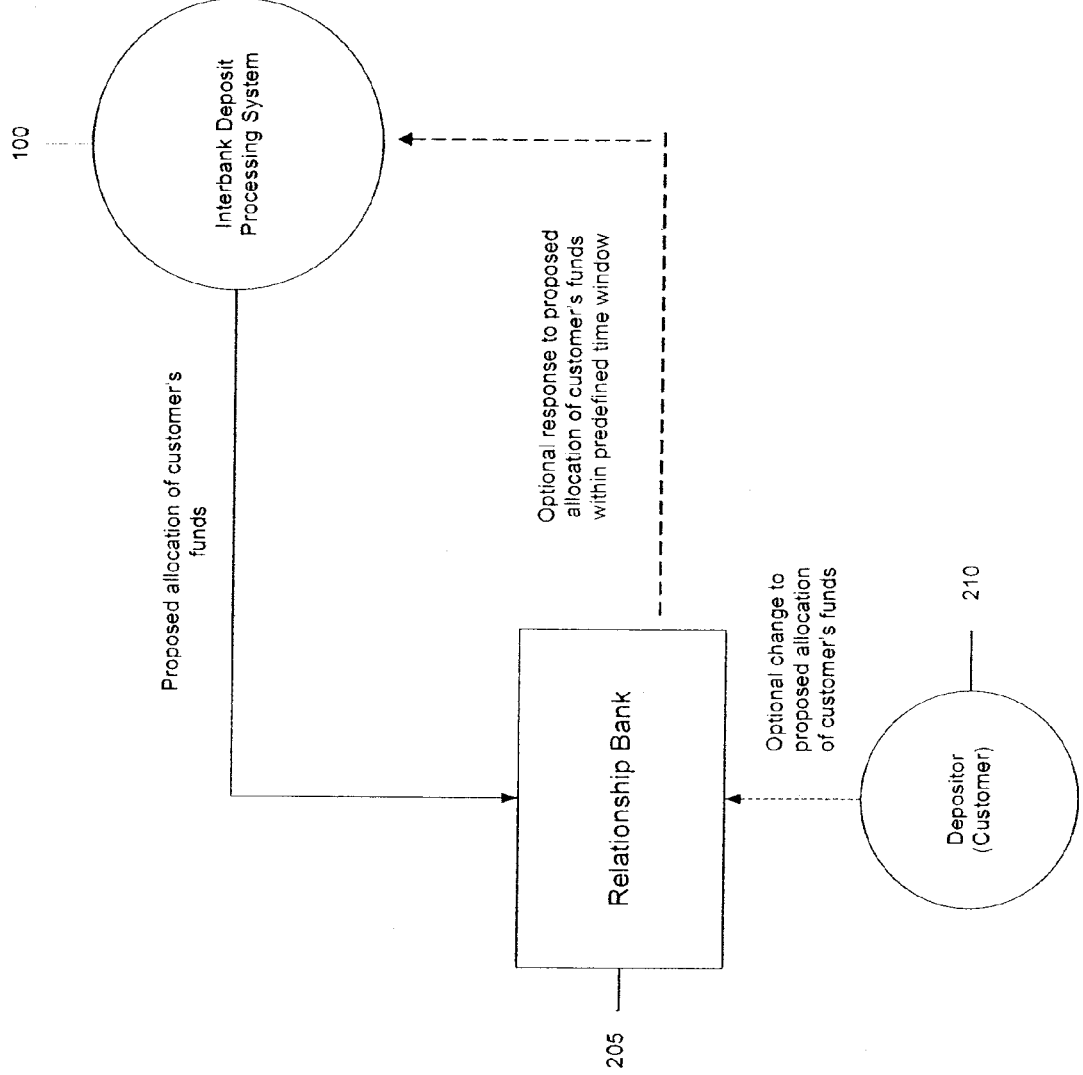
FIG. 2 is a block diagram illustrating an order review feature of the Interbank Deposit Placement System of FIG. 1.

As shown in FIG. 2, prior to each placement of customer funds through the IDPS 100, the Relationship Bank 205 associated with the Depositor 210 makes available to the Depositor 210 a proposed list of Receiving Banks that will establish deposits for Depositor 210. The Depositor 210 may inform the Relationship Bank 205 of the names of Receiving Banks at which the Depositor does not want to deposit funds, and in turn, the Relationship Bank provides that information to IDPS 100. For example, at a particular time of day (e.g., 2:30 p.m. Eastern Time) on the Placement Date, the IDPS 100 provides to the Relationship Bank 205 a list of the proposed Receiving Banks that will issue deposits to Depositor 210, the proposed amounts to be deposited in each such Receiving Bank, and a list of alternate Receiving Banks. The Depositor 210 is offered a time window (e.g., until 3:30 p.m. Eastern Time) to obtain from the Relationship Bank the list of proposed Receiving Banks, whereby the Depositor may then advise the Relationship Bank of the name or names of any proposed Receiving Banks or proposed alternate Receiving Banks at which the Depositor 210 does not want its funds placed. The Relationship Bank advises the IDPS 100 of the Depositor's determinations regarding any Receiving Bank(s) at which the Depositor 210 does not want its funds placed.

The Relationship Bank places the Depositor's funds through the IDPS 100, which in turn allocates the funds to deposits at one or more Receiving Banks in amounts that do not exceed the established deposit insurance limit. The IDPS 100 may monitor the credit quality of the banks and may ensure that no funds placed for a Depositor through the IDPS 100 at any one bank exceed the established deposit insurance limit.

Figure 3:
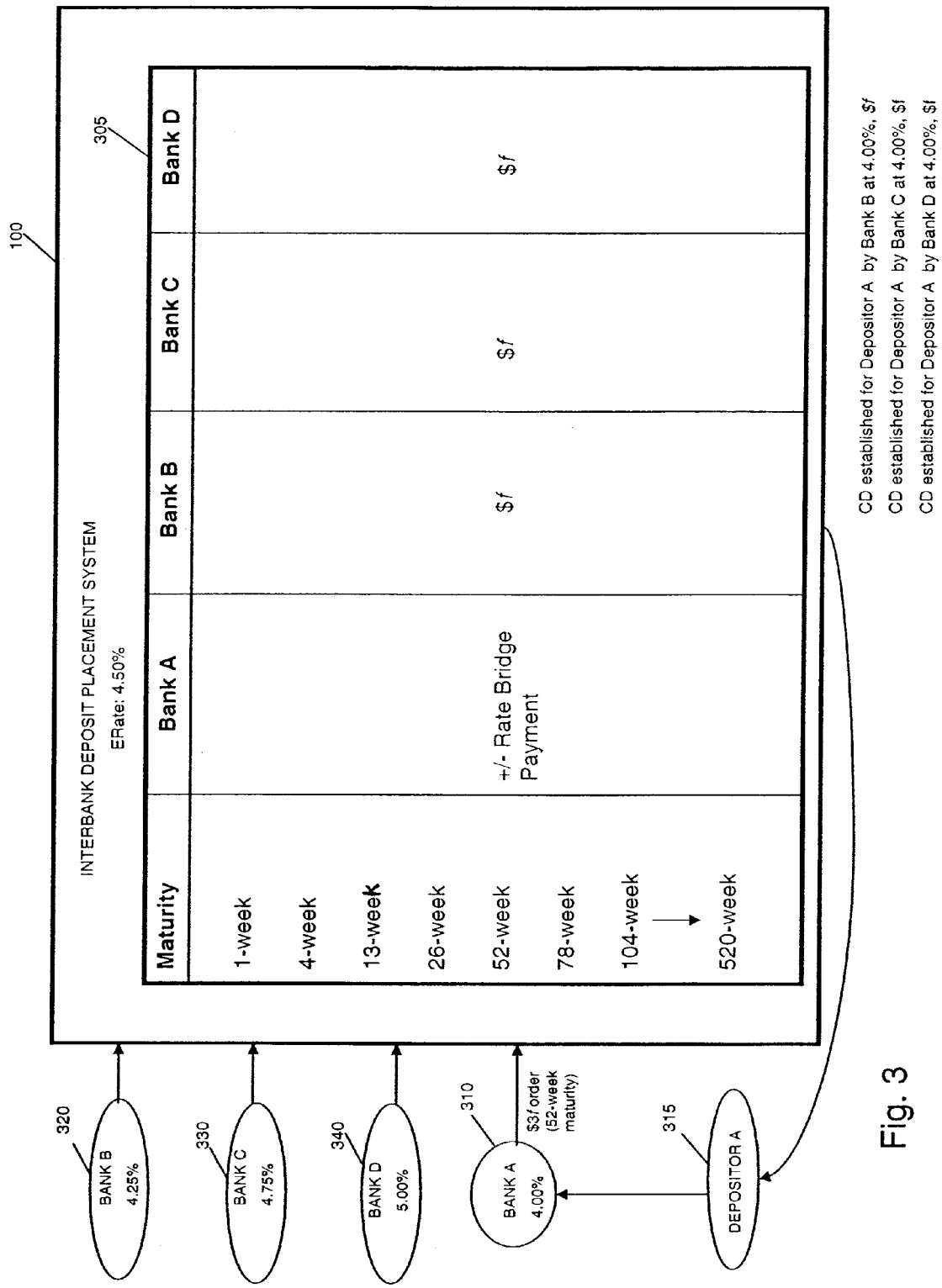
FIG. 3 is a block diagram showing the Interbank Deposit Placement System with a settlement table for implementing the distribution of deposits and compensating for deposit mismatches among multiple Relationship Banks in accordance with one embodiment of the present invention.

FIG. 3 is a block diagram showing IDPS 100 with a Settlement Account table 305 for implementing the distribution of potential deposit amounts and compensating for deposit mismatches among multiple Relationship Banks 310, 320, 330, 340 in accordance with one embodiment of the present invention. For example, Relationship Bank 310 places an order with IDPS 100 indicating that its Depositor 315 seeks to place $3f through IDPS 100 at an interest rate of 4.00% (the interest rate offered by Relationship Bank 310) for a 52-week CD (or other maturity desired by the Depositor 315). After processing the order, the IDPS 100 acts as an issuing agent for Relationship Banks 320, 330, and 340, and issues three separate deposits each of which is in an amount ($f) that with accrued interest will not exceed the established deposit insurance limit ($f). Each CD issued by IDPS 100 will be issued to the Processor as subcustodian for Relationship Bank 310. Settlement Account table 305 is used to track the transfer of funds and is adjusted (through the Rate Bridge Payment calculation) for differences in the interest rates offered by each of the Relationship Banks 320, 330 and 340 when compared to the interest rate (ERate) determined by the IDPS 100.

Present Value Payments (PVPs) are credited or debited to and from the Settlement Accounts of each bank. For example, if the ERate determined by the IDPS 100 is 4.50% and Bank 310, for which multiple deposits having a 52-week maturity are established, offers an interest rate of 4.00%, the Settlement Account of Bank 310 will be updated to reflect the Rate Bridge Payment. The Depositor Agreements will disclose the possible payment and/or receipt of a PVP by banks arising from reciprocal deposits through the Interbank Placement Service.

The Processor may calculate the amount of a payment to compensate for differences between the offered deposit interest rate and the ERate determined by the Processor.

The amount of the payment may be determined based on:
(1) the ERate determined by the Processor;
(2) the offered deposit interest rate;
(3) the amount of the specific deposit portion;

(4) a number of times during a predetermined time period that earnings on the specific deposit portion are to be compounded;

(5) a number of times that the predetermined time period is to occur;

(6) a payout frequency of earnings on the specific deposit portion; and (7) an established discount rate.

The established discount rate may be the applicable London Interbank Offered Rate (LIBOR) or a derivative thereof.

Figure 4:
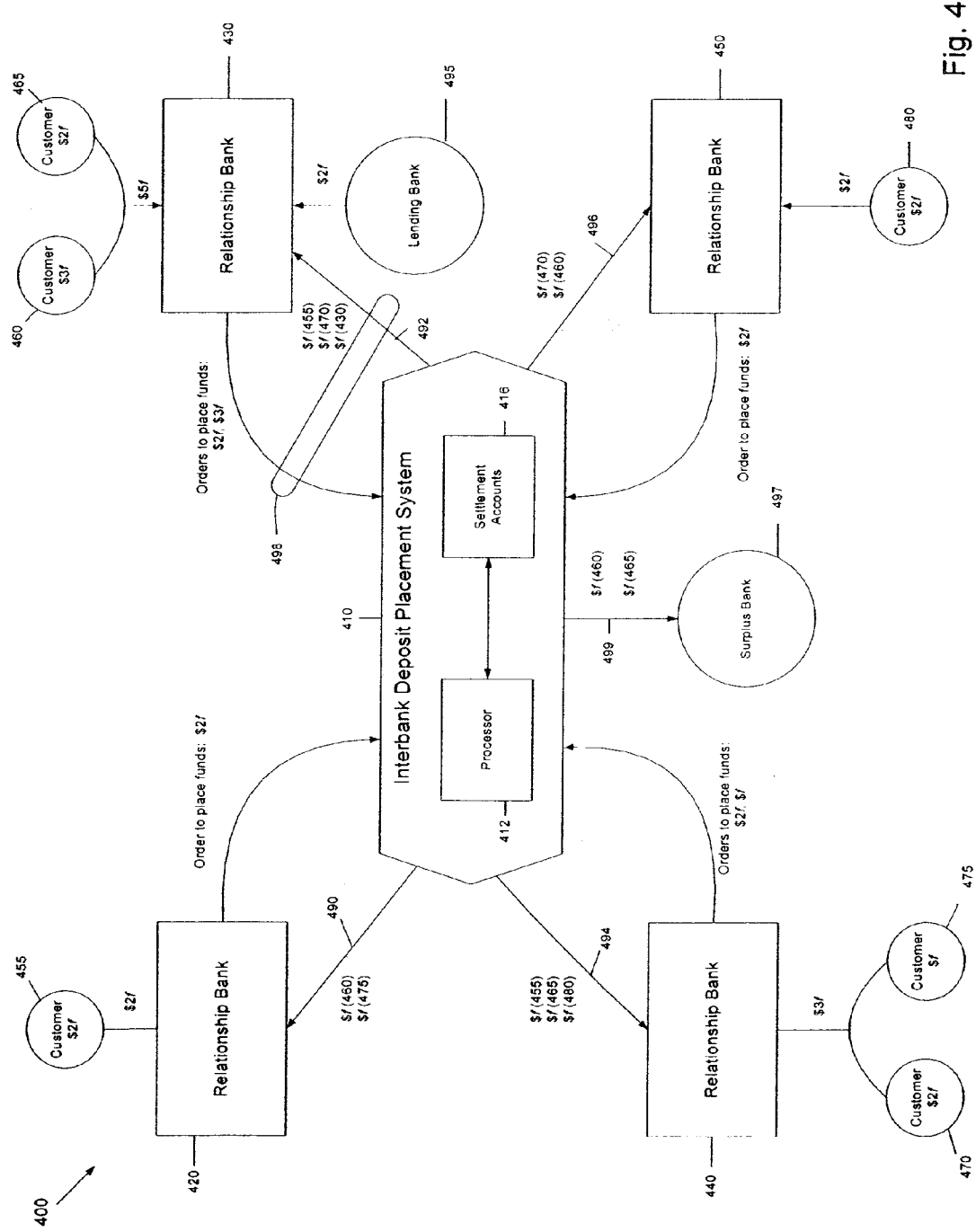
FIG. 4 is a block diagram showing how deposit mismatches among multiple Relationship Banks are compensated for in accordance with one embodiment of the present invention.

FIG. 4 is a block diagram showing how deposit mismatches among multiple Relationship Banks are compensated in FIG. 4 according to one embodiment of the present invention. Although FIG. 4 depicts funds as flowing from the bank to IDPS 410, and vice versa, it should be understood that, in a preferred embodiment, all such fund transfers may be implemented by crediting or debiting Settlements Accounts 416 established for each of the Relationship Banks.

On a date specified by the Sponsor of the IDPS 410 (the "Placement Date"), the Processor 412 in the IDPS 410 will compare the orders placed by each Relationship Bank 420, 430, 440, 450 submitting orders to process potential deposit amounts and sort the orders based on the maturities of the deposits being sought by the Depositors. The orders submitted for processing by each Relationship Bank 420, 430, 440, 450 on a particular Placement Date will first be allocated for deposits at other Relationship Banks submitting funds to the IDPS 410 for placement in deposits of the same maturity. If all of the orders submitted by Relationship Banks to the IDPS 410 cannot be processed on a particular Placement Date, the IDPS 410 will either inform the Relationship Bank that potential deposit amounts cannot be placed or, in the alternative, place the excess funds as described below.

FIG. 4 shows an example in a system 400 where a "mismatch" occurs and Relationship Banks 420, 430, 440, 450, are "made whole" through the addition of deposits from a Lending Bank. Under the assumption that all deposit terms offered by each of the Relationship Banks 420, 430, 440, 450, are the same, no present value payments are transferred.

Relationship Bank 420 receives a potential deposit amount of $2f from customer 455. Relationship Bank 420 inputs an order into IDPS 410 to process a $2f potential deposit amount.

Relationship Bank 430 receives a potential deposit amount of $3f from customer 460, and a potential deposit amount of $2f from customer 465. Relationship Bank 430 inputs orders into IDPS 410 to process potential deposit amounts totaling $5f.

Relationship Bank 440 receives a potential deposit amount of $2f from customer 470, and a potential deposit amount of $f from customer 475. Relationship Bank 440 inputs orders into IDPS 410 to process potential deposit amounts totaling $3f Relationship Bank 450 receives a potential deposit amount of $2f from customer 480. Relationship Bank 450 inputs an order into IDPS 410 to process a $2f potential deposit amount.

Relationship Bank 420 receives from IDPS 410 via path 490, two deposit portions each valued at $2f and associated with potential deposit amounts placed by customers 460 and 475. Since Relationship Bank 420 received a total value of deposit portions equivalent to the value of orders it input into IDPS 410, the Relationship Bank 420 is "made whole."

Relationship Bank 430 receives from IDPS 410 via path 492, three deposit portions each valued at $f and associated with potential deposit amounts placed by customers 455, 470 and 480. Since Relationship Bank 430 only received $3f of deposit portions and the value of orders it input into IDPS 410 was $5f, a "mismatch" 498 occurs. Due to "mismatch" 498, the Relationship Bank 430 is not "made whole" and thus an additional $2f of funds is deposited into Relationship Bank 430 by Lending Bank 495 through IDPS 410.

Relationship Bank 440 receives from IDPS 410 via path 494, three deposit portions each valued at $f and associated with potential deposit amounts placed by customers 455, 465 and 480. Since Relationship Bank 440 received a total value of deposit portions equivalent to the value of orders it input into IDPS 410, the Relationship Bank 440 is "made whole."

Relationship Bank 450 receives from IDPS 410 via path 496, two deposit portions each valued at $f and associated with potential deposit amounts placed by customers 460 and 470. Since Relationship Bank 450 received a total value of deposit portions equivalent to the value of orders it input into IDPS 410, the Relationship Bank 450 is "made whole."

For each specific Relationship Bank 420, 430, 440, 450, the IDPS 410 allocates at least some of the deposit portions so as to minimize or eliminate the difference between the total amount of potential deposit amounts for which the specific Relationship Bank 420, 430, 440, 450 placed orders into the IDPS 410 and the total amount of deposit portions allocated to the specific Relationship Bank 420, 430, 440, 450 by the IDPS 410. The amount of each specific deposit portion is no greater than the established deposit insurance limit.

If the total amount of deposit portions allocated to the specific Relationship Bank 420, 430, 440, 450 is less than the total amount of potential deposit amounts for which the specific Relationship Bank 420, 430, 440, 450 placed orders into the IDPS 410, the IDPS 410 calculates an amount of additional funds to be deposited by the Lending Bank into the specific Relationship Bank 420, 430, 440, 450 and directs the movement of such additional funds to the specific Relationship Bank 420, 430, 440, 450 so that the difference is minimized or eliminated.

For Surplus Bank 497, IDPS 410 in transaction 499 assigns to Surplus Bank deposit portions associated with potential deposit amounts placed by customers 460, 465, totaling $2f In some cases on a Placement Date, a bank may elect to be only a Receiving Bank, in this capacity a Surplus Bank. The IDPS 100 may have profits or losses in connection with placement of potential deposit amounts at Surplus Banks.

Each bank accepting deposits through the IDPS 410 (in this capacity, a "Receiving Bank") on the day following a Placement Date (the "Settlement Date") will issue to the Sponsor, as subcustodian for the Relationship Bank, one or more deposits, each in an amount not to exceed the established deposit insurance limit on the terms established for the deposits by the Relationship Bank and its Depositor. On each Placement Date, a bank that places Depositor funds through the IDPS 410 will be both a Relationship Bank (with respect to orders it places on behalf of its depositors) and a Receiving Bank (with respect to deposit portions it accepts through IDPS 410). On a Placement Date, a Surplus Bank may be both a Relationship Bank and a Receiving Bank or only a Receiving Bank.

Figure 5A:
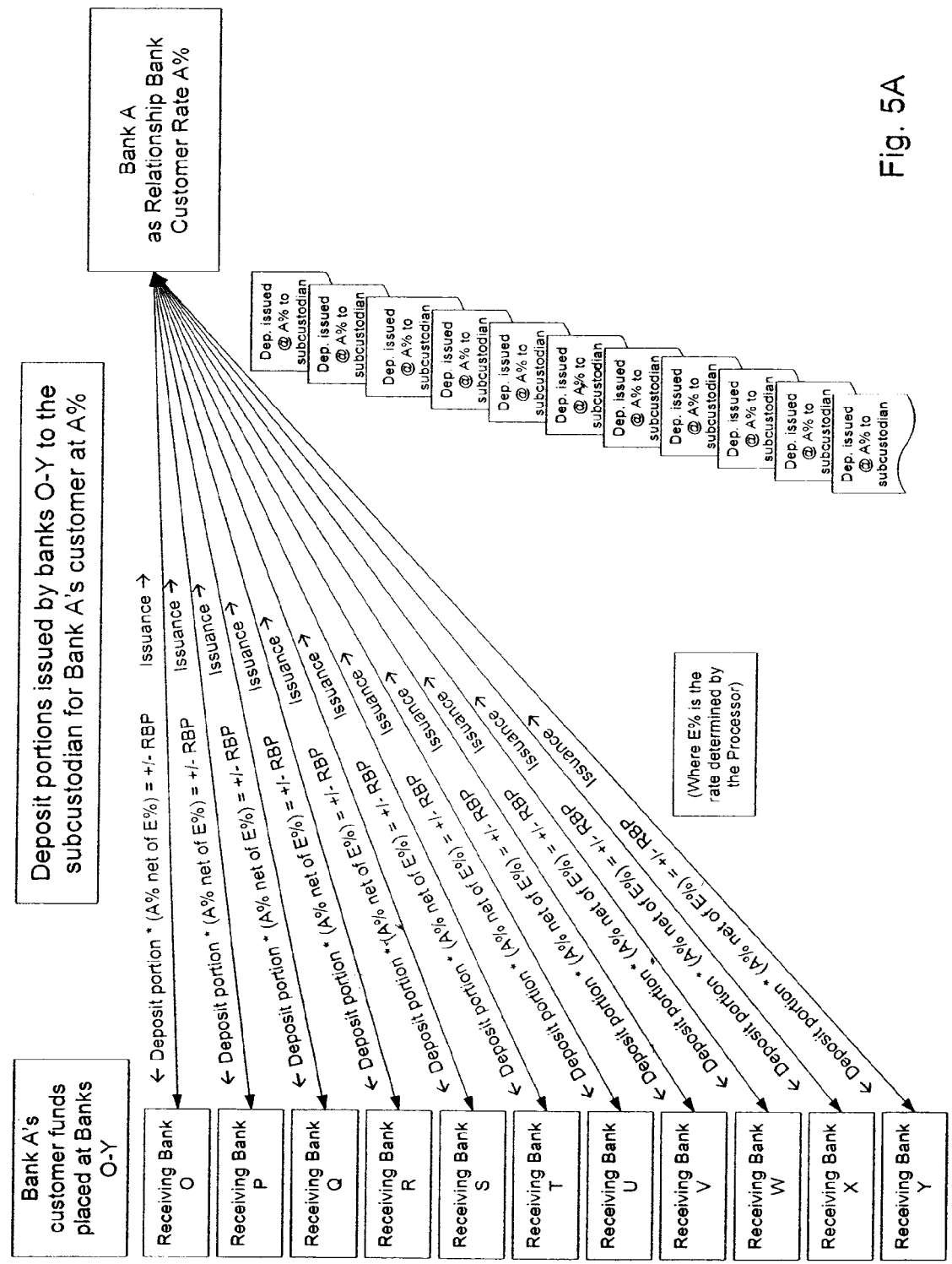
FIG. 5A is a block diagram illustrating the allocation of a potential deposit amount among multiple deposits, each established by a different bank in the name of the subcustodian of custodian for the depositor.
Figure 5B:
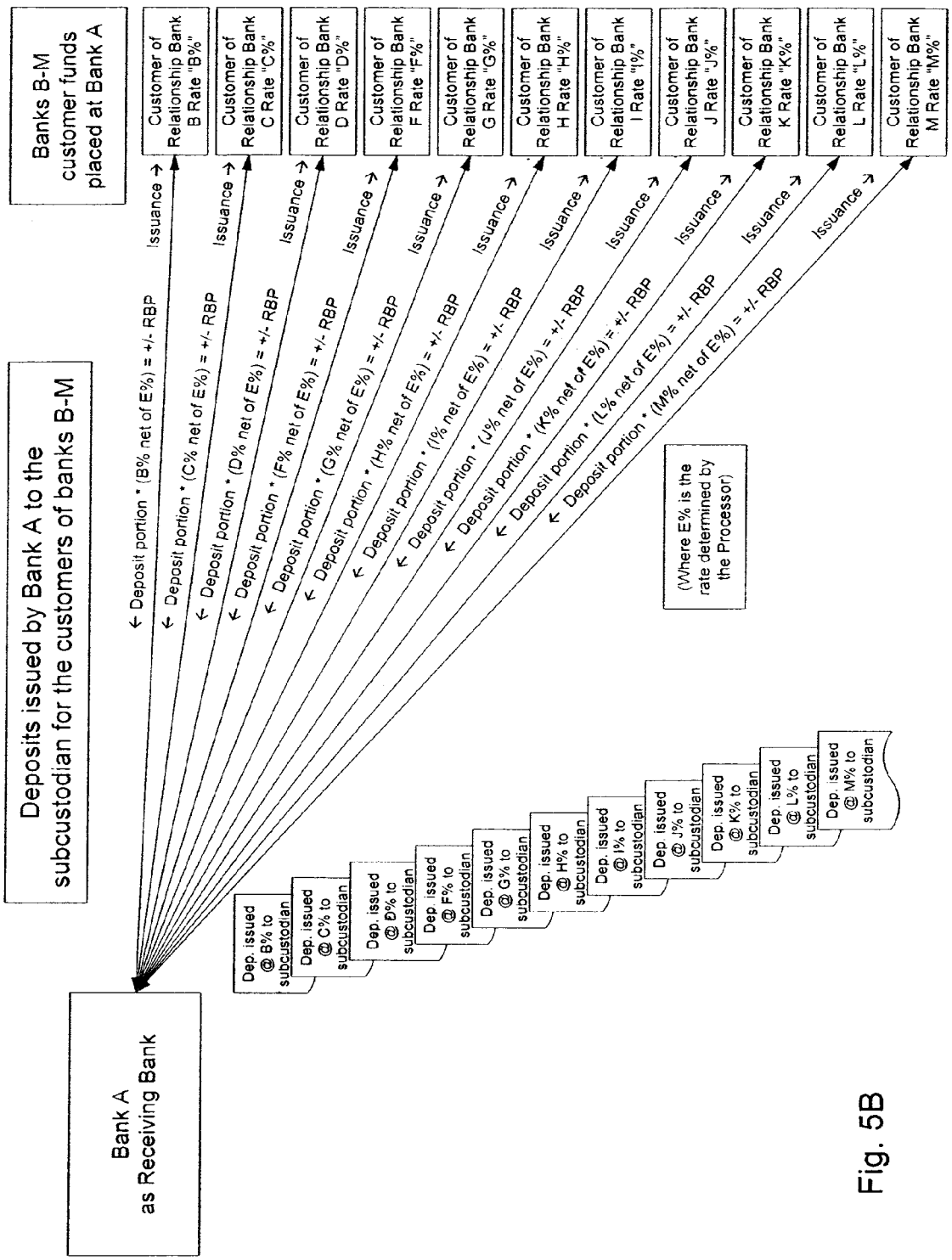
FIG. 5B is a block diagram illustrating the establishment of deposits by a single bank, each in exchange for a portion of a potential deposit amount received from multiple banks.

FIG. 5 is a block diagram illustrating the partitioning of a potential deposit amount of a depositor into multiple deposits issued by different banks (Receiving Banks) to the subcustodian for Bank A. (Bank A is the custodian for Bank A's customer). FIG. 5B illustrates the deposits issued by Bank A to the subcustodian for Banks B-M. FIGS. 5A and 5B illustrate how Bank A is "made whole".

Figure 6:
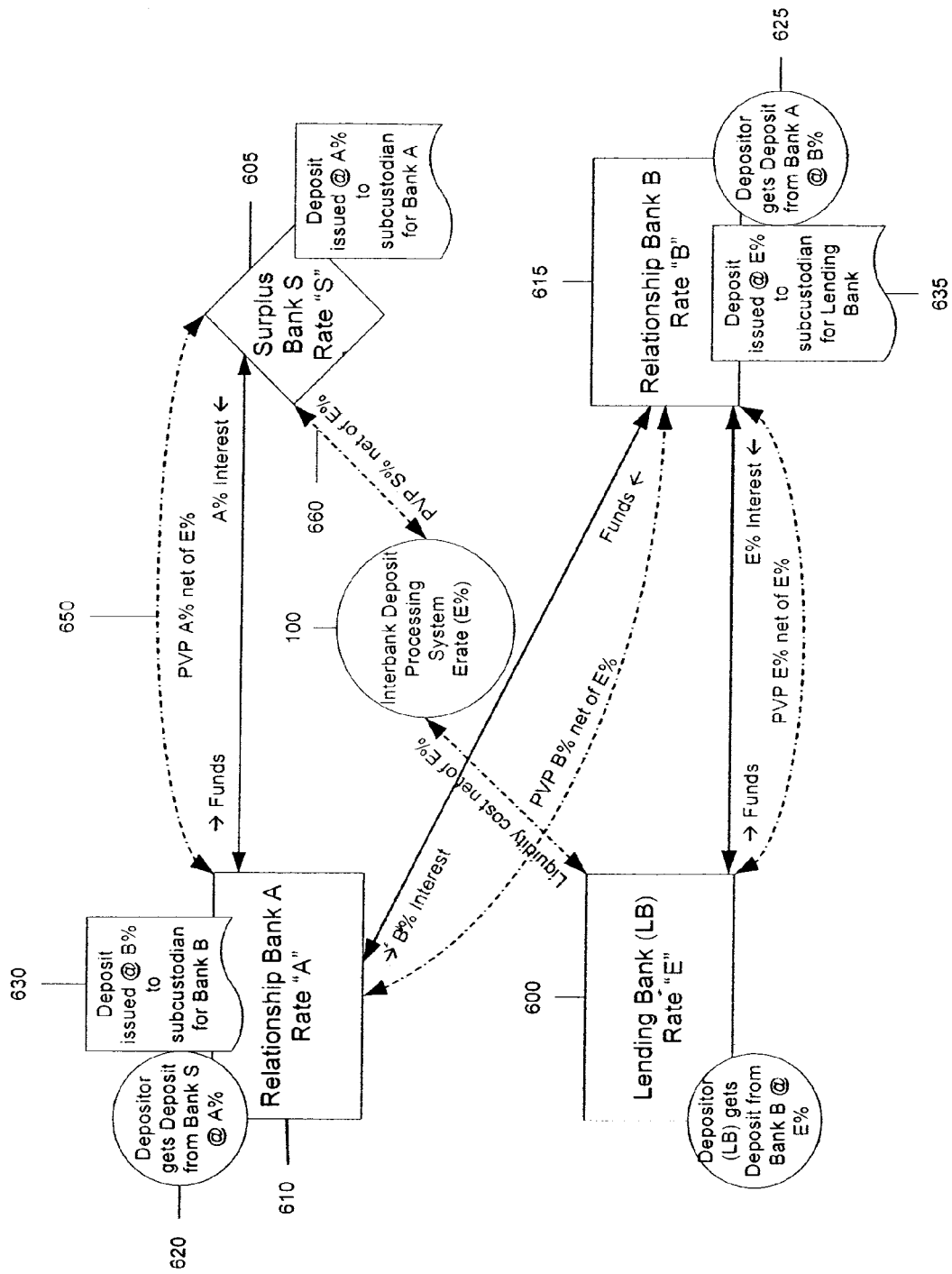
FIGS. 6 and 7 are block diagrams that illustrate the placement processes used by the Interbank Deposit Placement System in accordance with a preferred embodiment of the present invention.
Figure 7:
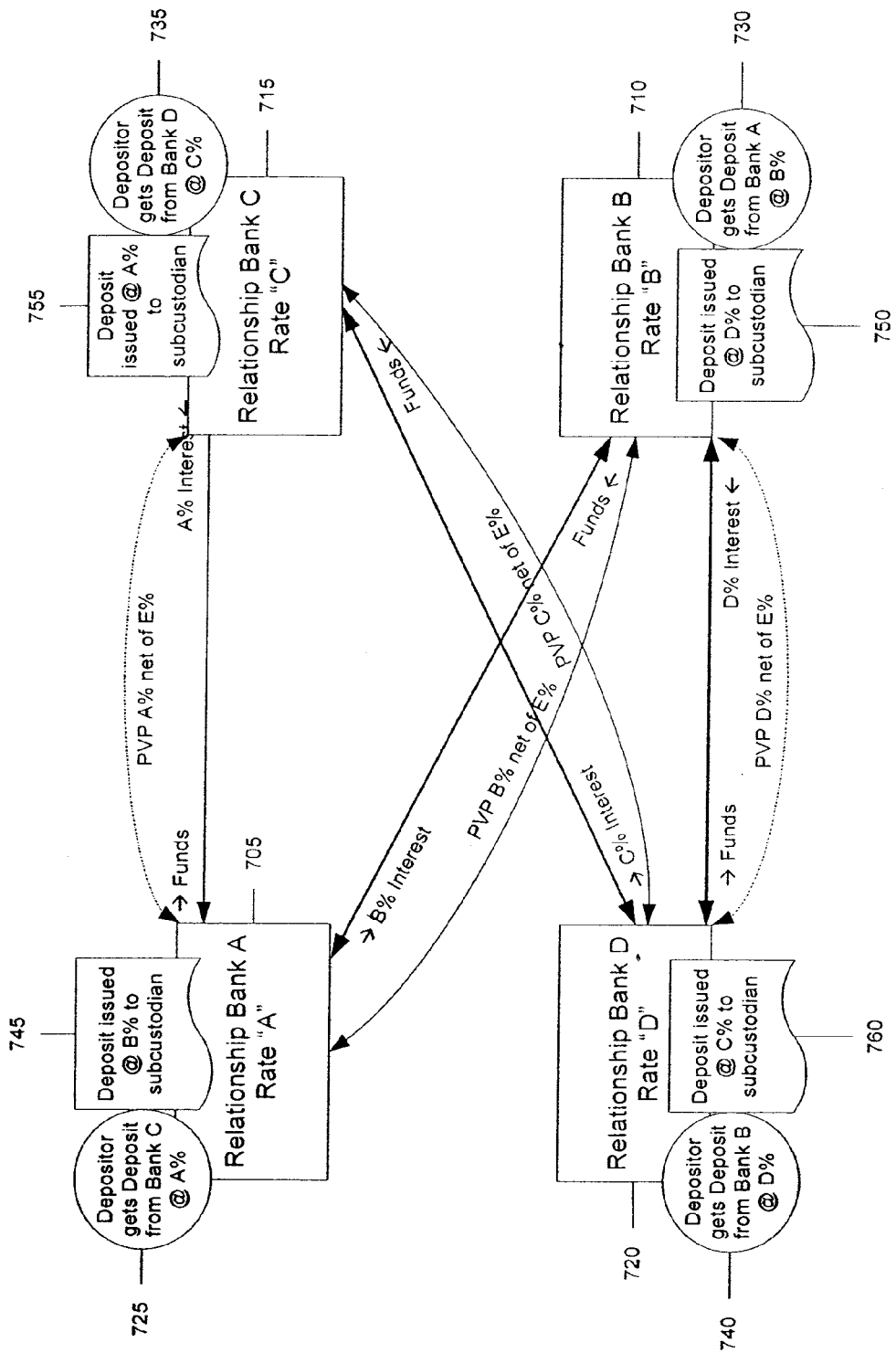

FIGS. 6 and 7 are block diagrams that illustrate the placement processes used by the IDPS 100 in accordance with the present invention. Placements of customers' funds through the IDPS will not necessarily be made on a one-to-one basis. A Relationship Bank placing $1,000,000 of the funds of a Depositor through the IDPS with eleven Receiving Banks on a particular Settlement Date may, as a Receiving Bank, issue fourteen deposits with aggregate principal amounts of $1,000,000 to the Depositors of fourteen other Relationship Banks. There may be little or no overlap between the banks, acting as Receiving Banks, at which the Relationship Bank places funds and the banks, acting as Relationship Banks, to which the Relationship Bank, acting as a Receiving Bank, issues deposits. (See also FIGS. 5A and 5B).

On any Placement Date, variances may exist between the interest rate a Relationship Bank is willing to pay to its Depositor on a deposit and the interest rate other Relationship Banks are willing to pay to their Depositors on deposits of equal maturity. These differences will be reconciled by a one-time present value payment ("PVP"). The PVP is calculated by the IDPS 100 by comparing the interest rate that the Relationship Bank has established with its Depositor (and that the Depositor is receiving on deposits issued by the Receiving Banks) with an "ERate" established by the IDPS 100 as described below. It could also be determined by other means. The ERate will be determined on each Placement Date based on the volume weighted average interest rate of the deposits of each maturity placed through the IDPS 100 on that Placement Date. A Relationship Bank will pay or receive a PVP based upon the difference, if any, between the interest rate established with its Depositor, and the ERate. The IDPS 100 may also permit deposit maturity mismatches between deposits issued by Relationship Banks and deposits issued by Receiving Banks that would be reconciled by procedures developed by the IDPS 100.

As set forth above, the IDPS 100 will first seek to match the funds submitted for placement by one Relationship Bank with the funds submitted for placement by other Relationship Banks on the same Placement Date. As a result, banks that are not submitting funds for placement typically will not be able to receive funds submitted for placement by a Relationship Bank. However, if on any Placement Date some or all of the funds a Relationship Bank has submitted for placement through the IDPS 100 are not matched with funds submitted for placement by other Relationship Banks, the unmatched funds may be placed in amounts not to exceed the established deposit insurance limit at banks that are willing to accept deposits in excess of the funds they have submitted for placement through the IDPS 100 on that Placement Date or at banks that are willing to accept deposits and have not submitted any funds for placement through the IDPS 100 on that Placement Date (in this capacity each, a "Surplus Bank" 605). The IDPS 100 will have discretion on any Placement Date to select the banks that will receive funds as Surplus Bank 605 and may negotiate with the Surplus Bank 605 the interest rate that the Surplus Bank 605 will pay for deposits.

Referring to FIG. 6, on each Placement Date that a bank agrees to accept deposits as a Surplus Bank 605, it will act as a Receiving Bank. It will issue a deposit(s) to the subcustodian for Relationship Bank 610 and will pay or receive a PVP 650 based on the difference between the interest rate(s) the Relationship Bank 610 agreed to with its Depositor 620 and the ERate, as determined by the IDPS 100 on the Placement Date. In addition, the Surplus Bank 605 may pay to the IDPS 100 a PVP 660 representing any excess of the interest rate negotiated between the Surplus Bank 605 and the IDPS 100 over the applicable ERate or receive from the IDPS 100 a PVP 660 representing any excess of the applicable ERate over the rate negotiated between them.

For each deposit a Surplus Bank agrees to establish for a Relationship Bank's Depositor, the IDPS 100 will request a bank with which the IDPS 100 has established a credit facility ("Lending Bank" 600) to make a deposit at a Relationship Bank 615 in an amount equal to the amount of the unmatched deposit placed with the Surplus Bank 605. The Relationship Bank 615 will establish a deposit for the Lending Bank 600 with an interest rate equal to the applicable ERate. The Lending Bank 600 may in its discretion place deposits in excess of the established deposit insurance limit with any Relationship Bank 610, 615.

All funds will be transferred and deposits established on the Settlement Date. In addition to a bank's agreement with the Sponsor pursuant to which the Sponsor will serve as the bank's subcustodian when the bank is acting as a Relationship Bank, each bank will also enter into an agreement with the Sponsor to act (i) as the bank's issuing agent when it is a Receiving Bank and (ii) as settlement bank for payments in connection with each deposit the bank has issued as a Receiving Bank and each deposit the bank is holding as custodian for its Depositors as a Relationship Bank. Among other things, these arrangements between the banks and the Sponsor permit deposits issued by Receiving Banks and funds placed by Relationship Banks through the IDPS 100 to be netted on the Settlement Date.

The Processor, through the IDPS 100, will provide each bank that is issuing a deposit and/or transferring funds on a Settlement Date with settlement instructions and supporting reports setting forth (i) the principal amount, rate, maturity and payment terms of each deposit the Processor will issue as issuing agent for the bank, (ii) the principal amount, rate, maturity and payment terms of each deposit to be issued to the subcustodian of the bank, and (iii) the amount of funds, if any, to be transferred to or received in bank's Settlement Account. In general, a bank transferring funds through the IDPS 100 on a Settlement Date (as Relationship Bank) will also issue deposits (as a Receiving Bank) in aggregate principal amounts equal to the funds it transfers and, therefore, will generally make or receive netted payments through its Settlement Account reflecting placement fees and PVPs. In addition to the netted amounts, a Surplus Bank 605 will receive the principal amount of the deposit(s) it issued to Depositors.

After the Settlement Date, the Issuing Agent for Bank 610 (as Receiving Bank), through the IDPS 100, will provide Bank 610 and the subcustodian for Bank 615 with instructions and supporting reports with respect to payments in connection with the deposits issued by Bank 610. The subcustodian for Bank 615, through the IDPS 100, will provide reports to Bank 615 (as custodian) with respect to each deposit it is holding for a Depositor 625. Any payments owed on the deposits established by a bank (as a Receiving Bank) will be netted against payments owed on the deposits it is holding as custodian for its depositors and will be paid to or received in the bank's Settlement Account. Requests for early withdrawal of the deposit will be made through the IDPS 100 by a Relationship Bank, and payments of withdrawal proceeds, minus any penalties, will be made by a Receiving Bank into its Settlement Account and received by a Relationship Bank in its Settlement Account.

Referring to FIG. 7, a Depositor that has funds in an amount that exceeds the established deposit insurance limit, but wishes to have all of the funds eligible for established deposit insurance, will enter into an agreement with a Relationship Bank (the "Depositor Agreement") to place potential deposit amounts with one or more banks in amounts not to exceed the established deposit insurance limit. The Relationship Bank 705, 710, 715, 710 will agree to act as agent for Depositor 725, 730, 735, 740, respectively, in placing the order to process the Depositor's potential deposit amounts through the Interbank Deposit Placement System. The Relationship Bank 705, 710, 715, 720 will agree to act as the custodian for the Depositor 725, 730, 735, 740, respectively, in holding the deposits established by the Receiving Banks. The Relationship Bank 705, 710, 715, 720 (as Receiving Bank) will issue a deposit to the subcustodian for each Relationship Bank from which a deposit portion has been allocated by the Interbank Deposit Placement System. For example, Relationship Bank 710 is allocated funds from a depositor of Relationship Bank 720. In transaction 750, Relationship Bank 710, as Receiving Bank, will issue a deposit to the subcustodian for Relationship Bank 720.

No physical documents evidencing the deposits are issued. Instead, the deposits are recorded on records of the Receiving Bank in the name of the subcustodian for the Relationship Bank. The Processor maintains records of the deposits issued for each Depositor.

If a Depositor wishes to reinvest the funds from a maturing deposit, the Depositor may so instruct the Relationship Bank and the Relationship Bank may resubmit the funds for placement through the IDPS 100 as a new placement, in which case the funds may be deposited at the Receiving Bank that issued the maturing deposit or at a different Receiving Bank.

All payments with respect to the deposits issued by Receiving Banks will be made by Receiving Banks to Relationship Banks through the Processor. The Relationship Bank, in turn, will credit the funds to the account of the Depositor or disburse them at the Depositor's direction.

In one embodiment, the IDPS 100 will generally not place deposits with a bank on any Placement Date on which the bank is not submitting deposits of a Depositor for placement through the IDPS 100. However, on Placement Dates when there is an excess of deposits to be placed through the IDPS 100 that cannot be placed in amounts under the established deposit insurance limit at the banks submitting orders, the IDPS may, in its sole discretion, offer funds to Surplus Banks. The interest rate on these unmatched deposits will be established by the IDPS 100 with each Surplus Bank through a procedure established by the Processor. Although a bank accepting such funds will be acting as a Surplus Bank, it will establish deposits in the same manner as if it were a Receiving Bank, including paying or receiving a PVP to reconcile variances with the ERate, and will have the same obligations with respect to the deposits as a Receiving Bank. The Surplus Bank may pay to the IDPS 100 any excess of the interest rate negotiated between the Surplus Bank and the IDPS 100 over the applicable ERate and may receive from the IDPS 100 any excess of the applicable ERate over the rate negotiated between them. The Interbank Deposit Service enables each bank to continue setting its own deposit terms (e.g., interest rates), which reflect the demand of the bank for funds and local market conditions. This mechanism ensures that low-cost funds passed through the IDPS 100 benefit the banks that placed customer funds through the IDPS 100.

In one embodiment, the Sponsor(s) associated with the Interbank Deposit Service may receive a fee from each bank for every transaction. In one embodiment, the fee is a specified number of basis points per dollar transferred through the IDPS 100. In another embodiment, the fee is lower for shorter term deposits (i.e., 4-week versus 52-week deposits).

In another embodiment, placement of funds only occurs between deposits having the same maturity, such that (for example) a bank submitting customer funds to be placed in a 13-week CD to the IDPS 100 only receives 13-week money in exchange. Alternatively, the Interbank Deposit Service may be implemented to permit and facilitate the transfer of one maturity of deposit for another, or facilitate the transfer of non-maturity deposits. The Interbank Deposit Service may also implement uniform practices and procedures for handling early withdrawals.

The IDPS 100 may allocate funds among multiple banks pursuant to one or more algorithms. For example, the algorithm used for allocating funds is chosen to reach goals such as:

(1) Minimizing the total number of Deposit Mismatches/Deposit Placement Failures;

(2) Maximizing the percentage of Lending Bank deposits that are fully insured; and (3) Reducing the average net present value payment made by each bank.

In yet another embodiment, for a given number of banks, the algorithm selects, within each maturity, the largest potential deposit amounts and swaps the first tranche (in some amount up to the established deposit insurance limit) with a similar sized tranche from a bank with the second largest potential deposit amount that earns the same or similar interest rate, and then does the same with the bank submitting the third largest potential deposit amount and same or similar interest rate, and so on. In such an embodiment, a "similar" interest rate might be an interest rate within a specified range of the interest rate of the potential deposit amounts being allocated.

In yet another embodiment, the placement operation is conducted for products having a given maturity as follows. First, all of the excess customer funds from each Relationship Bank are submitted to the IDPS 100 and divided into tranches. Second, the average interest rate offered by each bank on the funds submitted to the IDPS 100 is determined. In an embodiment, the interest rate so determined is a weighted average. Third, an ERate is selected based on the determinations in step two above. In one embodiment, the ERate is the average value determined in step two. Fourth, the IDPS 100 determines an ordering for the banks based on the closeness of the interest rate of each bank to the ERate. Fifth, the largest deposit from the bank with an interest rate closest to the ERate is allocated through the IDPS 100. The tranches that make up this deposit are swapped with tranches from customers at banks whose interest rates are the furthest from the ERate. For example, the first tranche can be swapped with a tranche from a deposit in a bank whose interest rate is the highest above the ERate, and the second tranche can be swapped with a tranche from a deposit in a bank whose interest rate is the lowest below the ERate, and so on. Sixth, the second largest deposit from the bank is allocated through the IDPS 100, and so on.

Other embodiments employ similar algorithms, except that these algorithms match tranches first with tranches from banks whose interest rates are closest to the ERate. Matching in this manner tends to reduce the amount of Rate Bridge payments that must be made through the IDPS 100.

Other possible algorithms for the placement operation are apparent to those skilled in the art. In some placement operations, a standard tranche size is determined and used, and equal-sized tranches are matched among banks. The standard tranche size is at or, more often, below the established deposit insurance limit, such that any deposit formed from a tranche, with interest (if any), is fully insured. In such embodiments, each excess deposit is divided into standard size tranches, and any remainder ("a remainder-tranche") may be dealt with by matching it with other, like-sized remainder-tranches, or as an unmatched deposit pursuant to a mismatch resolution procedure. A goal may be to maximize the size of the individual tranches, as well as minimizing the total number of tranches.

The choice of which algorithms to use for the placement operation and/or for determining tranche size may depend on the particular deposit terms of the excess deposits submitted to the IDPS 100 for allocation. The placement operation may require one-to-one placements where a tranche from one bank is swapped with a like-sized tranche from another bank. In other embodiments, one-to-one placements are not necessary. For example, a first customer from a first bank receives a deposit from a second bank, a second customer from the second bank receives a deposit from a third bank, and a third customer from the third bank receives a deposit from the first bank. In this example, each bank has contributed a tranche to the IDPS 100, and each bank has issued a deposit to the customer of another bank.

The customer is responsible for ensuring that he or she is fully covered by deposit insurance in all deposits (as is currently the case with all other bank accounts) but the IDPS 100 attempts to ensure that the deposits transferred through the IDPS 100 are fully insured. Each customer may be required or requested to identify, at the time he or she places a deposit, information to the IDPS 100 regarding all banks in which it otherwise does not want to place deposits (which would include all banks in which the customer maintains an account). In situations where the initial run of the algorithm places a deposit in a bank where a particular customer has already insured deposits, the IDPS 100 reallocates such new deposit to another bank.

At the initial implementation of the invention in a given market, the IDPS 100 may initiate the placement algorithm only one day per week (the Placement Date). In a vigorous market, more frequent, and ultimately, multiple and/or continuous daily placements may take place.

Municipal deposits (a deposit of a state or local governmental entity) can receive special treatment using the IDPS 100. For example, in the United States many states and municipalities require as a matter of local or state law or as a matter of preference or practice that their deposits be placed with financial institutions located in or doing business within the state, county or municipality. Accordingly, the IDPS 100 can direct such municipal funds to banks within the state or community where they originated, either based on a preference specified by the customer, and/or automatically in accordance with applicable law. When the local market might be very small, the IDPS 100 may reserve the right to reject or limit orders to process potential deposit amounts of municipalities until such time as it is able to find acceptable local placements.

In the case of very large potential deposit amounts, the IDPS 100 may utilize one of several possible mechanisms to ensure that all the interest earned on such deposits remains fully covered by deposit insurance (for example, by allocating interest payments in deposits among approved banks that did not receive portions of the potential deposit amount (i.e., principal)).

The present invention can further encompass various means for handling deposit mismatches. Deposit mismatches (or "unmatched deposits") can occur when a bank transfers deposits through the IDPS 100 and there are not enough other eligible banks with which the IDPS 100 can place funds. This is most likely to occur when a bank transfers through the IDPS 100 large potential deposit amount, whether from one or many customers.

Mismatches are minimized by balancing the maximum size of the potential deposit amounts that may be submitted with the number of banks and the frequency of the Placement Dates. In spite of such measures, mismatches can be expected to occur.

To ensure full deposit insurance coverage, a portion (e.g., $f) of a $1,000,000 potential deposit amount that was mismatched in its entirety is placed with a Surplus Bank in an amount that is no more than the established deposit insurance limit. The Surplus Bank is required to assume responsibility for issuing a deposit to the customer who deposited the potential deposit amount at the Relationship Bank, as well as paying or receiving interest through the IDPS 100 as an upfront present value payment, or, alternatively, as a flow of funds over time. The remaining portions of the $1,000,000 mismatch are similarly placed with other Surplus Banks.

In order to return to the Relationship Bank the same amount of deposits that the Relationship Bank placed into the IDPS 100, the IDPS 100 arranges for a Lending Bank to deposit $1,000,000 or portion thereof into the Relationship Bank in exchange for a deposit at the ERate. The deposit placed by the Lending Bank has the effect of providing a source of liquidity to the IDPS 100.

The Lending Bank and the IDPS 100 may have an understanding or a contract that governs how to split the total return or loss associated with a mismatch.

The IDPS 100 can also facilitate the secondary market sale of deposits by customers. Although as a result of operation of the IDPS 100 a customer may hold multiple deposits in multiple banks, the customer may use the Relationship Bank to sell some or all of the deposits on a secondary market prior to their maturity. For example, a customer holds $1,000,000 in deposits that it obtained through the Interbank Deposit Placement System, e.g. ten deposits of $100,000 issued by ten different banks. For the purposes of this example, it is assumed either that the interest does not accumulate in the account holding the deposit, or that the insurance limit is in excess of $100,000. The customer instructs the Relationship Bank to sell $200,000 of the deposits. The Relationship Bank takes the sell order and conveys the sell order to a Preferred Broker to sell two of the $100,000 deposits. The Preferred Broker matches the customer to one or more buyers and consummates the sale. The Preferred Broker may maintain a secondary market in such deposits so as to facilitate transactions. If so, and when necessary, the Preferred Broker may purchase the deposits itself, selling them to the highest bidder at a later date.

The Preferred Broker notifies the IDPS 100, which, as the agent for the Relationship Bank (and indirectly for the customer), transfers the ownership of $200,000 in deposits to the buyer(s). The Processor may make the appropriate changes to the books and records it maintains associated with the deposits. The Preferred Broker becomes the agent of the buyer(s), with the IDPS 100 as the agent of Preferred Broker.

The Relationship Bank may collect a service fee. The Preferred Broker may receive a commission. The IDPS 100 may receive a transaction fee (which may be dependent on the size of the commission/spread of the Preferred Broker).

In accordance with the present invention, the IDPS 100 is an order placement engine that executes an order placement process. The order placement process utilizes a sophisticated algorithm that automatically matches orders based on a predefined set of rules. This ensures an order placement and execution utility that seeks to optimize, inter alia, three different variables:

(1) Minimize the total number of mismatches;
(2) Maximize the percentage of Lending Bank deposits that are fully insured; and
(3) Minimize net present value payments among banks.

Initially, the order placement engine is scheduled to process orders one or two times per week. As more banks participate in the Interbank Deposit Service and transaction volumes increase in the system, the matching schedule becomes more frequent, whereby the order placement engine could ultimately place orders many times on every business day. The order placement engine executes each type of deposit separately. The type of deposits that are expected to be supported by the IDPS 100 include (but are by no means limited to):

(1) 1-week deposit;
(2) 4-week deposit;
(3) 13-week deposit;
(4) 26-week deposit;
(5) 52-week deposit;
(6) 78-week deposit;
(7) 104-week deposit;
(8) 130-week deposit;
(9) 156-week deposit;
(10) 182-week deposit;
(11) 208-week deposit;
(12) 234-week deposit;
(13) 260-week deposit;
(14) 286-week deposit;
(15) 312-week deposit;
(16) 338-week deposit;
(17) 364-week deposit;
(18) 390-week deposit;
(19) 416-week deposit;
(20) 442-week deposit;
(21) 468-week deposit;
(22) 494-week deposit;
(23) 520-week deposit; and
(24) Municipality deposits (with the same maturities as listed above).
(25) Non-maturity deposits (e.g., non-time deposits)

The Order placement process involves the following steps:
(1) Pre-Processing;
(2) Adjusting the Optimization Scenario;
(3) Executing the Placement rules;
(4) Customer Review of Proposed Allocations;
(5) Resolution of Mismatches through Lending Bank deposits; and
(6) Finalize Placements.

The order placement and execution utility seeks to optimize several different variables including:

(1) Minimizing the total number of mismatches, which in turn, reduces the amount of funds that are needed from the Lending Bank, which the Relationship Banks accept to make their transactions whole. By reducing mismatches, the IDPS 100 minimizes its costs and simplifies its record keeping. The IDPS 100 is able to minimize mismatches by:

(a) Setting bank and customer potential deposit amount maximums. By instituting limits on the potential deposit amounts submitted by each bank overall and each individual bank customer, the IDPS 100 can manage the available liquidity in the system.

(b) Using a periodic placement cycle. As the business grows, the IDPS 100 adjusts the length of time between matching executions. Initially, the IDPS 100 may potentially place orders less than daily (e.g., once or twice a week) in order to increase the number of orders in the system, thereby decreasing the number of mismatches. In such instances, banks and their customers are informed of the Placement Date and no funds are transferred until the Settlement Date associated with that Placement Date.

(2) Minimize net present value payments. The matching of deposits through the
IDPS 100 is achieved through a mathematical algorithm that places funds with banks whose total interest payments are generally closest in value. This minimizes the net amount of present value payments (PVPs) that are made to or received by each Relationship Bank and Receiving Bank.

(3) Direct Lending Bank deposit placements to banks having the greatest deposit limits remaining. The Lending Bank may establish deposit limits for deposits established at each bank. In order to minimize costs and to afford greatest flexibility to the IDPS, the IDPS attempts to place Lending Bank funds with banks that have the largest deposit limits at the time of placement.

(4) Maximize the percentage of the Lending Bank deposits that are fully insured. In order to minimize costs to the IDPS 100 and risk to the Lending Bank, the IDPS 100 attempts to maximize the amount of any Lending Bank deposits used to cover mismatches that are fully insured. When a mismatch occurs, the Lending Bank provides funds to the Receiving Bank. In return for the funds from the Lending Bank, the Receiving Bank establishes a deposit for the full amount of such funds.

In one embodiment, an algorithm in Processor 412 of IDPS 410 is executed to break-down customer orders to process potential deposit amounts into insured deposit portions (tranches). Daily within each group, a maximum tranche size is calculated for each product group. Standard tranche sizes are designated based on the deposit terms. The tranche size is set such that the total deposit amount does not exceed the established deposit insurance limit during the term of the product, even if interest is compounded and held to maturity. All tranches are less than or equal to the calculated tranche size for that specific product group. Actual tranche sizes are determined daily during the execution of the matching rules and may take into account at least one rollover period. If an order to process a potential deposit amount is smaller than a system defined minimum tranche size, the order is processed as an exception. Orders are stored in tranches in the Processor. The placement engine is run for each product term separately.

Throughout the day, Relationship Banks submit orders to the IDPS 100 where they are stored in the Processor until the order placement optimization is executed. Prior to the placement and filling of Interbank Deposit Service orders, processing occurs to organize and categorize the orders placed by individual banks. This optimizes the order placement process.

Orders are organized/categorized into the following groups:
(1) Product Type: Certificate of Deposits and Municipal Certificate of Deposits.
(2) Product Terms: 1 week, 4 weeks, 13 weeks, 26 weeks, 52 weeks, or the like.

An optimization scenario is selected and the order match optimization is executed so as to optimize in some form the following three variables.
(1) Minimize the total number of Deposit Mismatches/Deposit Placement Failures;
(2) Maximize the percentage of Lending Bank deposits that are fully insured; and
(3) Reduce net present value payments to banks as a whole.

The IDPS 100 may prioritize these variables differently based on the make-up of orders in the system and the configuration of banks placing orders in the placement cycle. For example, if most Lending Bank deposits could be fully insured, then the IDPS 100 may want to place more emphasis on minimizing present value payments rather than on minimizing the number of mismatches.

Depending on how the optimization scenario is adjusted to prioritize the three variables, orders are placed based on:

(1) Product type (Municipal CDs generally must be placed first because of the additional geographical restrictions on their placement);

(2) Potential deposit amount (larger potential deposit amounts are generally placed first to minimize Deposit Mismatches/Deposit Placement Failures);

(3) Interest Rate (orders with similar interest rates are matched to minimize present value payments);

(4) Credit-worthiness of bank (orders from least creditworthy institutions are placed first to reduce the likelihood that a mismatch will occur at such institutions which will, in turn, minimize risk to the IDPS 100 and Lending Bank); and (5) The ability of a Relationship Bank to offer the Lending Bank a fully insured deposit (banks who have already issued deposits to the Lending Bank may be allocated deposits first to maximize the number of fully insured Lending Bank deposits).

The IDPS 100 attempts not to place deposits in a bank where a customer already has deposits. In addition to utilizing a customer validation process, the IDPS 100 places a preference on placing orders with banks that belong to different geographical territories. Banks are grouped by geographic territories. Each state is grouped into a geographic region of the United States. Logic is included to select an order from:

(1) a different state within the geographic region of an order;

(2) a different geographic region than the state that the order originated from;

(3) a different county within the same state; and (4) a same state as the selected order (often necessary for municipal deposits).

Figure 8A:
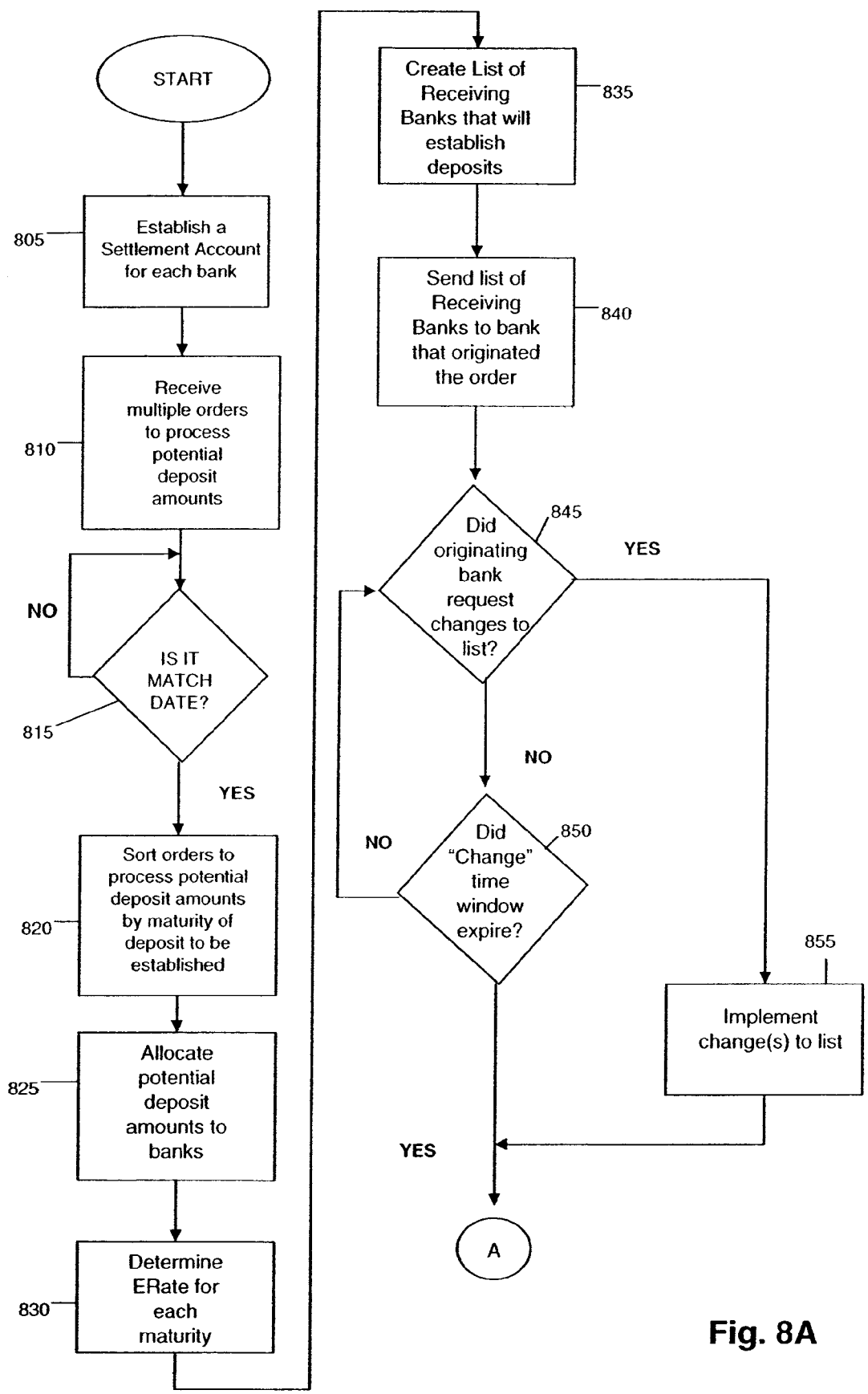
FIGS. 8A and 8B, taken together, is a high-level functional flowchart of processes used by the Interbank Deposit Placement System of FIG. 1 to process potential deposit amounts in accordance with a preferred embodiment of the present invention.
Figure 8B:
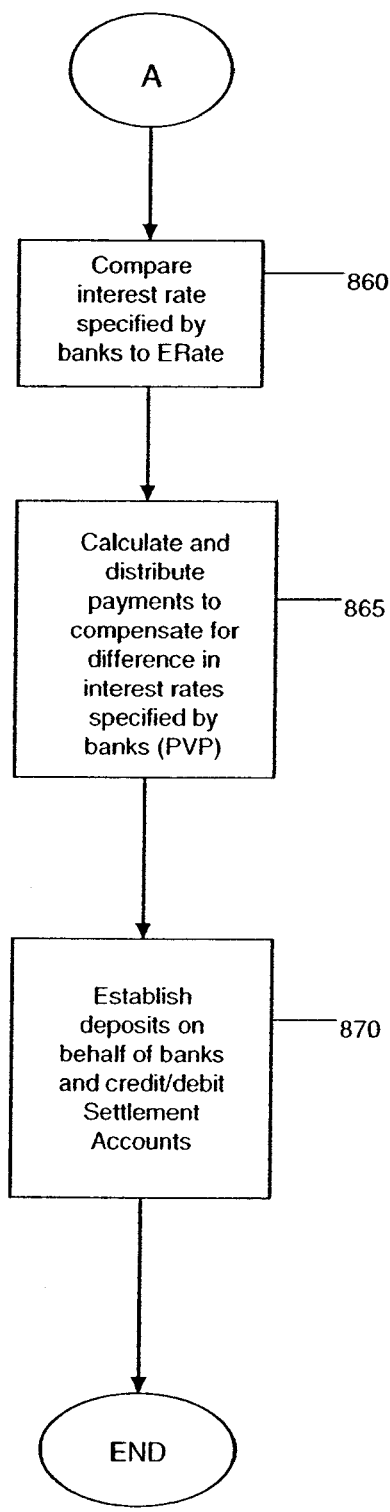

FIGS. 8A and 8B show a series of steps implemented in accordance with the present invention. The steps set forth in 8A and 8B may occur in the sequence set forth therein, or in a difference sequence. Potential deposit amounts that exceed an established deposit insurance limit are processed by the Processor so that the potential deposit amounts are fully insured. The potential deposit amounts are allocated by the Processor to banks. The Processor, in turn, establishes on behalf of the banks multiple deposits for Depositors of the potential deposit amounts. Each deposit that is a time deposit has a predetermined maturity. In step 805, a Settlement Account is established for each bank. In step 810, the Processor receives multiple orders to process the potential deposit amounts. In step 815, a determination is made if the present day corresponds to a predetermined Placement Date associated with the orders. In step 820, based on the orders, the Processor sorts by maturity the deposits to be established. In step 825, each of the potential deposit amounts is partitioned into multiple deposits to be established. Each such amount does not exceed the established deposit insurance limit. In step 830, the Processor determines an ERate based on a volume weighted average rate of the orders the Processor receives. The Processor sorts the maturities of the deposits to be established based on the orders. In step 835, the Processor assigns each of the deposit portions to a specific one of the banks in response to each order, and creates a proposed list of the banks to which the deposit portions are to be allocated. In step 840, the proposed list is available to a recipient (e.g., the depositor that originated the potential deposit amount order) for review. The recipient is offered the option of modifying the proposed list during an established "change" time window. In steps 845, 850, 855, the Processor waits until the "change" time window expires. If the recipient desires to make changes during the time window, those changes are implemented (step 855). After the "change" time window expires, the Processor compares an interest rate offered by each specific bank for a particular deposit maturity to an ERate established by the Processor for the particular maturity (step 860). In step 865, the Processor calculates the amount of a payment to compensate for differences between the interest rate specified by the banks and the ERate established by the Processor for the particular maturity. In step 870, for each deposit portion, a deposit is established on behalf of the Receiving Bank to which such deposit portion was assigned by the Processor. In step 870, on the settlement date the Processor credits and debits the Settlement Accounts, for appropriate banks to reflect payments and fees in respect of deposits established at a time after the Placement Date.

While several of the aforementioned examples refer to U.S. dollars and the current U.S. Federal Deposit Insurance Corporation (FDIC) $100,000 insurance limit, with appropriate substitutions these examples may be used to illustrate the implementation of the invention in systems using currencies other than dollars, with different insurance limits and with different institutions, and with different countries' insurance programs.

Furthermore, although certificate of deposits (CDs) have been disclosed as being used as deposits, other types of deposits may be supported by the placement engine.

The present invention may be implemented with any combination of hardware and software. If implemented as a computer-implemented apparatus, the present invention is implemented using means for performing all of the steps and functions described above.

The present invention may be implemented with any combination of hardware and software. The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. A computer-implemented method of processing large deposits that exceed an established deposit insurance limit so that the large deposits are fully insured, the large deposits being received from a plurality of unaffiliated banks from their respective depositors, the method comprising for at least some of the large deposits:

(a) receiving at a processor orders from the plurality of banks to process large deposits;

(b) automatically comparing, using the processor, each order to a preset maximum order amount;

(c) partitioning, using the processor, each of the large deposits for each order into a plurality of deposit portions if the order does not exceed a preset maximum order amount, each deposit portion not exceeding the established deposit insurance limit; and (d) assigning by the processor at least some of the deposit portions for each of the large deposits for each order to at least some banks that are unaffiliated with the bank that received the large deposit for deposit therein if the order does not exceed the preset maximum order amount.

2. The method of claim 1 wherein the preset maximum order amount is the maximum order amount that a specified bank can submit.

3. The method of claim 1 wherein the preset maximum order amount is the maximum order amount that a specified bank customer can submit, the bank customers being the depositors of the respective banks.

4. The method of claim 1 wherein the plurality of unaffiliated banks belong to a network of participating banks that place orders to process large deposits and receive deposit portions.

5. The method of claim 1 wherein the deposit portions are assigned in a manner so that at least some of the unaffiliated banks that place orders to process large deposits also receive deposit portions from other unaffiliated banks that place orders to process large deposits.

6. The method of claim 1 wherein step (d) further comprises assigning by the processor at least some of the deposit portions to at least some of the banks for deposit into CDs at the respective banks.

7. The method of claim 1 wherein each of the assigned deposit portions are associated with a specific depositor's account in the bank that the deposit portion was assigned to.

8. The method of claim 1 wherein the established deposit insurance limit is in accordance with U.S. law, regulations and rules established by the United States Federal Deposit Insurance Corporation (FDIC).

9. The method of claim 1 wherein steps (c)-(d) are executed by the processor on a periodic basis.

10. The method of claim 1 further comprising:
(e) checking by the processor whether a deposit portion of a specific depositor has been assigned to an unaffiliated bank that already holds a deposit portion of the specific depositor, and if so, reassigning by the processor the deposit portion to another bank that does not hold a deposit portion of the specific depositor.

11. A computer program product for processing large deposits that exceed an established deposit insurance limit so that the large deposits are fully insured, the large deposits being received from a plurality of unaffiliated banks from their respective depositors, for at least some of the large deposits, the computer program product comprising computer-readable media encoded with instructions for execution by a processor to perform a method comprising:
(a) receiving orders from the plurality of banks to process large deposits;
(b) automatically comparing each order to a preset maximum order amount;
(c) partitioning each of the large deposits for each order into a plurality of deposit portions if the order does not exceed a preset maximum order amount, each deposit portion not exceeding the established deposit insurance limit; and
(d) assigning at least some of the deposit portions for each of the large deposits for each order to at least some banks that are unaffiliated with the bank that received the large deposit for deposit therein if the order does not exceed the preset maximum order amount.

12. The computer program product of claim 11 wherein the preset maximum order amount is the maximum order amount that a specified bank can submit.

13. The computer program product of claim 11 wherein the preset maximum order amount is the maximum order amount that a specified bank customer can submit, the bank customers being the depositors of the respective banks.

14. The computer program product of claim 11 wherein the plurality of unaffiliated banks belong to a network of participating banks that place orders to process large deposits and receive deposit portions.

15. The computer program product of claim 11 wherein the deposit portions are assigned in a manner so that at least some of the unaffiliated banks that place orders to process large deposits also receive deposit portions from other unaffiliated banks that place orders to process large deposits.

16. The computer program product of claim 11 wherein step (d) further comprises assigning at least some of the deposit portions to at least some of the banks for deposit into CDs at the respective banks.

17. The computer program product of claim 11 wherein each of the assigned deposit portions are associated with a specific depositor's account in the bank that the deposit portion was assigned to.

18. The computer program product of claim 11 wherein the established deposit insurance limit is in accordance with U.S. law, regulations and rules established by the United States Federal Deposit Insurance Corporation (FDIC).

19. The computer program product of claim 11 wherein steps (c)-(d) are executed on a periodic basis.

20. The computer program product of claim 11 wherein the computer-readable media is encoded with instructions for execution by a processor to perform a method further comprising:
(e) checking whether a deposit portion of a specific depositor has been assigned to an unaffiliated bank that already holds a deposit portion of the specific depositor, and if so, reassigning the deposit portion to another bank that does not hold a deposit portion of the specific depositor.

* * * * *